(12) United States Patent
Lee et al.

(10) Patent No.: US 12,440,117 B2
(45) Date of Patent: Oct. 14, 2025

(54) FMCW RADAR TARGET DETECTION METHOD FOR VITAL SIGNAL DETECTION

(71) Applicant: Korea Electronics Technology Institute, Seongnam-si (KR)

(72) Inventors: Sung Ho Lee, Seoul (KR); Min Geon Shin, Seongnam-si (KR); Yong Chul Jung, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 434 days.

(21) Appl. No.: 18/085,817

(22) Filed: Dec. 21, 2022

(65) Prior Publication Data

US 2023/0200672 A1    Jun. 29, 2023

(30) Foreign Application Priority Data

Dec. 24, 2021    (KR) .................. 10-2021-0187049

(51) Int. Cl.
| | | |
|---|---|---|
| A61B 5/05 | (2021.01) | |
| A61B 5/00 | (2006.01) | |
| A61B 5/0205 | (2006.01) | |
| A61B 5/024 | (2006.01) | |
| A61B 5/08 | (2006.01) | |

(52) U.S. Cl.
CPC .............. *A61B 5/05* (2013.01); *A61B 5/0205* (2013.01); *A61B 5/7203* (2013.01); *A61B 5/7246* (2013.01); *A61B 5/725* (2013.01); *A61B 5/7257* (2013.01); *A61B 5/024* (2013.01); *A61B 5/0816* (2013.01)

(58) Field of Classification Search
None
See application file for complete search history.

(56) References Cited

U.S. PATENT DOCUMENTS

2019/0011549 A1 *  1/2019  Mercuri ............... G01S 13/584

FOREIGN PATENT DOCUMENTS

| KR | 101949799 B1 * | 2/2019 |
| KR | 102091974 B1 * | 3/2020 |

OTHER PUBLICATIONS

Korean Office Action issued on Oct. 19, 2023, in counterpart Korean Patent Application No. 10-2021-0187049 (5 pages in English, 6 pages in Korean).

* cited by examiner

*Primary Examiner* — Yi-Shan Yang
(74) *Attorney, Agent, or Firm* — NSIP Law

(57) ABSTRACT

There is provided an FMCW radar target detection method for vital signal detection. A method for detecting vital signals by using radar selects a range bin where there are accurate vital signals by using a correlation between a phase change profile of an IF signal caused by a minute motion, and a target signal intensity change profile, so that accuracy of estimation of vital signals can be enhanced through exact tracking of a person (target). In addition, clutter may be exactly removed by utilizing a phase unwrapping technique which is adaptive to an upper body motion change compared to a 180-degree fixed phase unwrapping technique.

20 Claims, 16 Drawing Sheets

| FMCW Central Frequency | 24 GHz | 61 GHz | 140 GHz |
| --- | --- | --- | --- |
| Small displacement | 0.4 mm | 0.4 mm | 0.4 mm |
| Delta Phase of IF signal | 46 degree | 117 degree | 268 degree |

Algorithm 1 Phase Unwrapping Procedure $r$ is the desired detected range index;
$r_{desired} = R(:, r)$ (R is the *range-slow time* matrix and Matlab syntax is used to select the r'th column);
$\phi = tan^{-1}(r_{desired})$;
for $n=1:M-1$ do
    if $\phi_{n+1} - \phi_n > \pi$ then
        $\phi_{n+1} = \phi_{n+1} - 2\pi$;
    else if $\phi_{n+1} - \phi_n < -\pi$ then
        $\phi_{n+1} = \phi_{n+1} + 2\pi$;
    else
        Do nothing;
end

FIG. 4

Algorithm 2 Adaptive Phase Unwrapping Procedure according to PRF

---

$r$ is the desired detected range index;

$r_{desired} = R(:, r)$   R is the *range-slow time* matrix $\Delta\omega = (\omega_R + \omega_H)/PRF,$   $\omega_R$ is Angular velocity with respiration
$\omega_H$ is Angular velocity with Heart beat $\phi = \tan^{-1}(r_{desired})$;
for $n=1:M-1$ do
   if $\phi_{n+1} - \phi_n > 2\pi - \Delta\omega,$ then
      $\phi_{n+1} = \phi_{n+1} - 2\pi$;
   else if $\phi_{n+1} - \phi_n < 2\pi - \Delta\omega,$ then
      $\phi_{n+1} = \phi_{n+1} + 2\pi$;
   else
      Do nothing;
end

FIG. 5

FMCW RADAR TARGET DETECTION METHOD FOR VITAL SIGNAL DETECTION

CROSS-REFERENCE TO RELATED APPLICATION(S) AND CLAIM OF PRIORITY

This application is based on and claims priority under 35 U.S.C. § 119 to Korean Patent Application No. 10-2021-0187049, filed on Dec. 24, 2021, in the Korean Intellectual Property Office, the disclosure of which is herein incorporated by reference in its entirety.

BACKGROUND

Field

The disclosure relates to a radar application technology, and more particularly, to a method for estimating a respiration signal and a heart rate signal which are vital signals by using frequency modulated continuous wave (FMCW) radar.

Description of Related Art

As many people are suffering from sleep deprivation recently, researches and development on sleeping management technology related to 'sleepnomics' are actively proceeding. Smartwatch technology has a demerit that inconvenience is caused due to limitations of a contact method. For this reason, technologies for indirectly measuring vital signals are being researched, and vital signal measurement technologies of a contactless method using radar are being researched.

1) Limitations of IR-UWB Radar

In the past, many researches were conducted for vital signal detection and motion detection using impulse radio ultra wide band (UWB) radar or impulse doppler radar. The UWB radar uses a bandwidth of 25% or more of a central frequency. A distance measurement method of the UWB radar measures the time it takes for a very short specific radio frequency (RF) signal (impulse signal) to reflect and return after being transmitted. That is, a distance may be measured by using a time of flight (TOF) of electromagnetic waves. This method has a merit of overcoming a narrow band problem of the FMCW radar. In vital signal detection, UWB radar and FMCW radar have unique merits for respective radar systems. The UWB radar provides fewer harmonic waves and a higher signal-to-noise ratio (SNR), whereas the FMCW radar can combine results of channels. Since the UWB radar is not able to combine channels, it may not estimate an angle, and one UWB system may have limitations on its capacity to estimate an angle and detect multiple targets.

2) Limitations on Distance Measurement by CW Radar and Advantages of FMCW Modulation Scheme A technology, called continuous wave (hereinafter, CW) radar or doppler radar, for measuring a respiration rate and a heart rate of a human body in a contactless method by using CW has been developed. However, a CW radar system is only able to measure speed and is not able to measure a range, and has limitations on its capacity to measure vital signals of a plurality of targets. Thanks to the development of integrated circuit technology, FMCW radar that enables high-speed waveform frequency modulation of high-frequency radar has been developed. The FMCW radar can measure a range of a target. When the FMCW radar capable of measuring a range is used, the demerit of the CW radar that only a single target vital signal is detected may be overcome, and it is possible to detect vital signals of a plurality of targets. For this reason, researches and development on contactless vital signal detection technology using FMCW radar, which is capable of detecting a range, speed, angle, are actively proceeding.

3) Problems Arising from Long RF Wavelength and Narrow Bandwidth of 24 GHz Radar 24 GHz FMCW radar has a wavelength of 1.25 cm, whereas 66 GH FMCW radar which has mmWave has a short wavelength of 5 mm. Herein, an mmWave band refers to a millimeter wave or extremely high frequency band which are electromagnetic waves of 30-300 GHz. Such mmWave 60 GHz radar has a shorter wavelength than 24 GHz FMCW radar, so that sensitivity to a minute motion can be enhanced.

In the case of 24 GHz FMCW radar, an industry-science-medical (ISM) band has a low distance resolution of 60 cm according to a narrow bandwidth of 250 MHz, but in the case of 60 GHz radar, there is an advantage of a high distance resolution of 2.5 cm according to a wide bandwidth.

4) Limitations on Miniaturization and Lightening of K Band Radar and Advantages of mmWave Radar A contactless vital signal detection technology that uses 24 GHz FMCW radar using a K band (18-26.5 GHz band) has a patch antenna of a large size due to a low RF frequency band, compared to mmWave radar. This technology has limitations to module miniaturization due to the size of the antenna, and has a wide RF beamwidth with a low RF frequency, and accordingly, may have a problem that clutter (undesired signal) increases when vital signals are measured.

Use of high frequency radar may give an additional advantage since directivity is higher than that of low frequency band radar. When an RF frequency increases, a beam angle is proportionally reduced. Accordingly, in the case of a high RF frequency, a beam angle directed toward a target existing at a long distance is small so that directivity is high. Since the directivity is high, a clutter factor which is a signal other than a target is small, so that the target can be detected with a higher SNR.

5) Problems of a Technique for Targeting a Range Bin Having Vital Signals

In order to measure vital signals based on FMCW radar, a person is normally detected first. When a person is targeted at a short distance, vital signals are normally measured from a plurality of range bins. There may be range bins that contain high noise signals or inappropriate vital signal information among the plurality of range bins. Accordingly, a target detection technology for selecting a range bin including accurate vital signal information has been researched, but there may be a problem that a range bin is not accurately detected.

SUMMARY

The disclosure has been developed in order to solve the above-described problems, and an object of the disclosure is to provide a method for enhancing accuracy of vital signal detection by more effectively detecting a target having FMCW radar-based vital signals, as a solution to overcome problems of related-art methods for maximum value target detection, which have been widely used for FMCW radar target detection, or related-art methods of using phase profile information.

According to an embodiment of the disclosure to achieve the above-described object, there is provided a method for detecting vital signals by using radar, the method including: converting radar signals which are pre-processed after being reflected and received from a human body into a plurality of range bins; tracking a peak range bin among the plurality of range bins; extracting phase signals of the plurality of range bins including the peak range bin; extracting magnitude signals of the plurality of range bins including the peak range bin; selecting one range bin based on a correlation coefficient between signals of the same range bin, with respect to the phase signals and the magnitude signals; and detecting vital signals by using phase signals regarding the selected range bin.

The method may further include separating only range bins regarding a moving target from the converted range bins, and tracking may include tracking a peak range bin among the separated range bins.

The method may further include unwrapping the extracted phase signals based on an adaptive reference value, and selecting may include selecting one range bin based on a correlation coefficient between signals of the same range bin, with respect to the unwrapped phase signals and the extracted magnitude signals.

The adaptive reference value may equal $2\pi-\Delta\omega$. $\Delta\omega$ may be determined based on an angular velocity of vital signals. $\Delta\omega$ may be determined based on a pulse repetition frequency (PRF).

Selecting may include: removing a noise by filtering the unwrapped phase signals; removing a noise by filtering the extracted magnitude signals; and determining one range bin based on a correlation coefficient between signals of the same range bin, with respect to the phase signals and the magnitude signals from which the noises are removed.

Detecting may further include: extracting a first vital signal by filtering a first band from phase signals regarding the selected range bin; and extracting a second vital signal by filtering a second band from the phase signals regarding the selected range bin.

Detecting may further include: spectrum-decomposing the first vital signal and outputting a signal; spectrum-decomposing the second vital signal; and removing harmonic components of the first vital signal from the spectrum-decomposed second vital signal, and outputting.

In addition, the first vital signal may be a respiration signal, and the second vital signal may be a heartbeat signal.

In addition, the range bins may be the peak range bin and a defined number of neighboring range bins.

According to another embodiment of the disclosure, there is provided a system for detecting vital signals by using radar, the system including: a conversion unit configured to convert radar signals which are pre-processed after being reflected and received from a human body into a plurality of range bins; a tracking unit configured to track a peak range bin among the plurality of range bins; a phase extraction unit configured to extract phase signals of the plurality of range bins including the peak range bin; a magnitude extraction unit configured to extract magnitude signals of the plurality of range bins including the peak range bin; a selection unit configured to select one range bin based on a correlation coefficient between signals of the same range bin, with respect to the phase signals and the magnitude signals; and a detection unit configured to detect vital signals by using phase signals regarding the selected range bin.

According to still another embodiment of the disclosure, there is provided a method for detecting vital signals by using radar, the method including: converting radar signals which are pre-processed after being reflected and received from a human body into a plurality of range bins; tracking a peak range bin among the range bins; extracting phase signals of the plurality of range bins including the peak range bin; unwrapping the extracted phase signals based on an adaptive reference value; selecting one range bin based on the unwrapped phase signals; and detecting vital signals by using phase signals regarding the selected range bin.

According to yet another embodiment of the disclosure, there is provided a system for detecting vital signals by using radar, the system including: a conversion unit configured to convert radar signals which are pre-processed after being reflected and received from a human body into a plurality of range bins; a tracking unit configured to track a peak range bin among the range bins; an extraction unit configured to extract phase signals of the plurality of range bins including the peak range bin; an unwrapping unit configured to unwrap the extracted phase signals based on an adaptive reference value; a selection unit configured to select one range bin based on the unwrapped phase signals; and a detection unit configured to detect vital signals by using phase signals regarding the selected range bin.

According to further embodiment of the disclosure, there is provided a computer-readable recording medium having a program recorded thereon to perform a method for detecting vital signals by using radar, the method including: converting radar signals which are pre-processed after being reflected and received from a human body into a plurality of range bins; tracking a peak range bin among the plurality of range bins; extracting phase signals of the plurality of range bins including the peak range bin; extracting magnitude signals of the plurality of range bins including the peak range bin; selecting one range bin based on a correlation coefficient between signals of the same range bin, with respect to the phase signals and the magnitude signals; and detecting vital signals by using phase signals regarding the selected range bin.

According to embodiments described above, a range bin where there are accurate vital signals is selected by using a correlation between a phase change profile of an IF signal caused by a minute motion, and a target signal intensity change profile, so that accuracy of estimation of vital signals can be enhanced through exact tracking of a person (target).

In particular, according to embodiments of the disclosure, clutter may be exactly removed by utilizing a phase unwrapping technique which is adaptive to an upper body motion change compared to a 180-degree fixed phase unwrapping technique.

In addition, an offset occurring in response to a change of a target position is reduced through phase calibration, so that accuracy of vital signals can be enhanced and continuous observation is possible while tracking the target.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 is a view illustrating a related-art unwrapping algorithm;

FIG. 5 is a view illustrating an unwrapping algorithm proposed in an embodiment of the disclosure;

DETAILED DESCRIPTION

Hereinafter, the disclosure will be described in more detail with reference to the accompanying drawings.

Figures 1, 2:
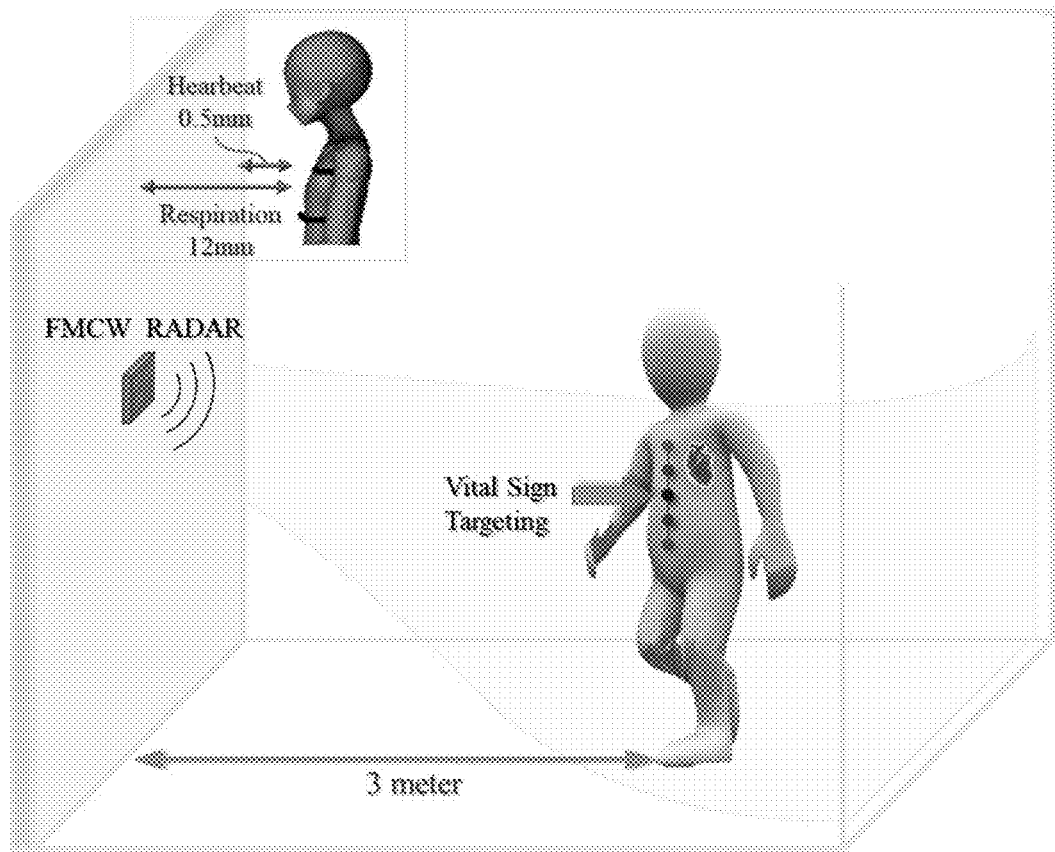
FIG. 1 is a conceptual diagram of FMCW vital signal detection.
FIG. 2 is a view illustrating phase change of an IF signal according to a central frequency.

FIG. 1 is a view illustrating a concept of an FMCW radar target detection method for detecting vital signals according to an embodiment of the disclosure. In an embodiment of the disclosure, a targeting technique using a new correlation coefficient is used to solve problems of a peak detection method, which is widely used in related-art FMCW radar-based vital signal processing, or targeting methods utilizing a Pearson correlation coefficient between a phase profile according to vital signals and a signal intensity profile, and to enhance accuracy of FMCW radar-based vital signal detection 1) FMCW Basic Principle FMCW radar outputs electromagnetic waves through a transmitter while linearly increasing a frequency of electromagnetic waves. Electromagnetic waves reflected from a target are received through a receiver, and a reception RF signal (?) is down-converted into an intermediate frequency (IF) signal through a mixer together with a transmission RF frequency.

Accordingly, as a distance to a target is longer from the radar, a difference in frequency between the reception RF signal and the transmission RF signal is greater, and accordingly, the IF signal has a high frequency component. In this way, in the FMCW radar, a distance to a target and a frequency of an IF signal have a proportional relationship. A speed of a target in the FMCW radar is measured through a doppler component. In the case of a target having a motion of being far away from the radar, a frequency size may be reduced due to the Doppler effect. Since a change of the frequency caused by the Doppler effect is very small, this appears as a change of the IF signal phase size. Since the frequency is reduced in the case of a target being far away, the phase may turn to the right on a polar coordinate system. The speed of the target may be measured by using such a change in the phase. FMCW radar distance and speed may be calculated by Equation 1 presented below:

[Equation 1]

$$S_T(t) = \cos\left[2\pi\left(f_0 t + \frac{B}{T_C}t\right)\right]$$

$$\tau = \frac{2R}{c}(R > 0)$$

$$S_R(t) = S_T[t - \tau](t > \tau)$$

$$f_d = \frac{-2v_r}{c}f_0,$$

$$v_r = v_a \cos\theta$$

$$f_b = |f_{Tx} - f_{Rx} \pm f_d| = \frac{2R}{c} \cdot \frac{B}{T_c} \pm f_d$$

$$R = \frac{cf_b T_c}{2B},$$

$$v_r = \frac{f_d \cdot c}{-2 \cdot f_0}$$

As described above, a distance to a target in an FMCW radar signal is configured by spectrum decomposition of an IF signal and such a frequency resolution corresponds to one range bin. Herein, the range bin is a group of specific distance components. A distance resolution in FMCW radar is indicated by c/2B (c=light speed, B=frequency modulated bandwidth). In the case of 60 GHz radar, a 6 GHz frequency modulated bandwidth is operated, such that a distance resolution is 2.5 cm and the distance resolution corresponds to a frequency resolution of 7.7 KHz. The distance resolution is required to increase in order to distinguish between two or more persons in a specific space or to target a vital signal occurrence point precisely.

2) FMCW Radar-Based Vital Signal Detection Method

The chest or abdomen may move forward and backward due to respiration and heartbeat. A movement of the upper body made by respiration may have a frequency of 0.1-0.5 Hz and may have a minute motion of 1-12 mm, and a movement of the upper body made by heartbeat may have a frequency of 0.8-2.0 Hz and may have a minute motion of 0.1-0.5 mm due to heartbeat. Such a minute motion may cause an IF frequency to change due to the micro Doppler effect and a minute distance component change.

Such a small frequency change appears as an IF signal phase. A small distance change (displacement) in FMCW radar may be indicated by $\Delta\phi=2\pi f_c\Delta\tau=4\pi\Delta d/\lambda$ due to characteristics of electromagnetic waves. $f_c$ is a central frequency of a transmission RF signal. Accordingly, as the RF increases, sensitivity as to a distance increases, and a respiration rate and a heart rate which are vital signals may be estimated by using a phase change. The phase change of the IF signal according to the central frequency is illustrated in FIG. 2.

3) Difficulty in Measuring Vital Signals Due to a Plurality of Range Bins.

Figure 3:
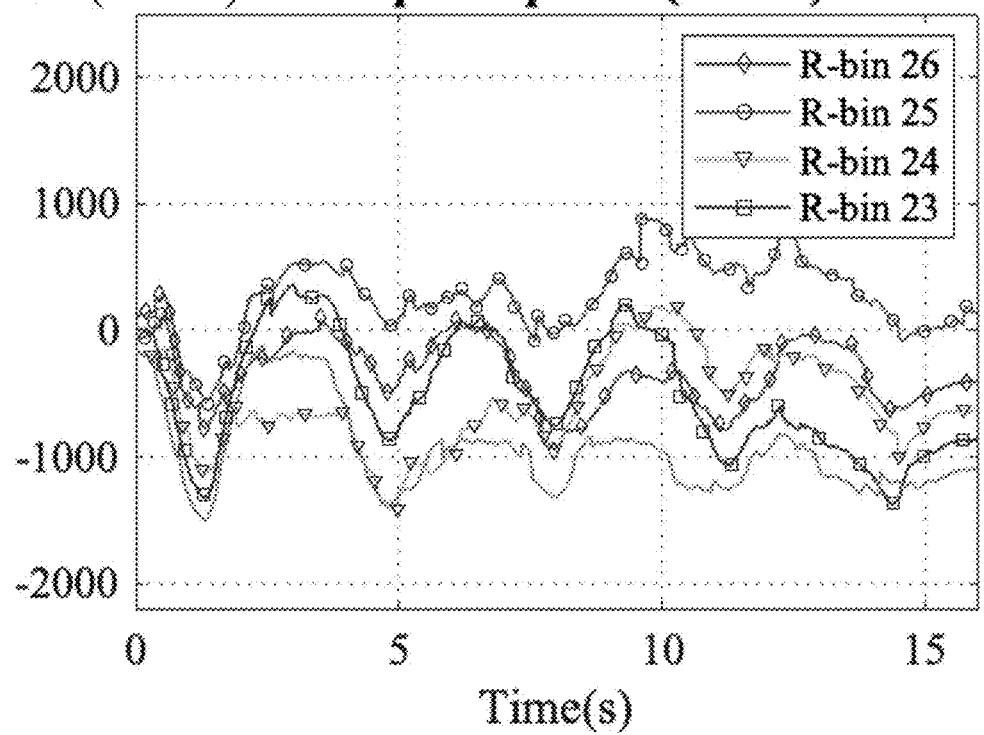
FIG. 3 is a view illustrating states of vital signals existing in a plurality of range bins.

Vital signal detection using FMCW radar may detect a minute motion of the upper body having heart and lung. However, there are problems that vital signals are distributed over the large upper body and are detected from a plurality of range bins 23, 24, 25, 26 as shown in FIG. 3. A technology that selects a range bin having strong vital signals from the plurality of range bins is required. FIG. 3 shows change in an IF signal phase according to a phase profile. At 61 GHz radar, a minute motion of 5 mm made by respiration appears as a phase change of 1464 degrees.

An embodiment of the disclosure proposes a range bin selection technique which uses a correlation coefficient according to inversely proportional relations between a range bin phase profile and a range bin reflection power level (radar cross section (RCS) size) profile, through a new unwrapping method, in order to select a range bin where strong vital signals exist among vital signals existing in the plurality of range bins in an upper body.

4) Adaptive Phase Unwrapping Method

As described above, in the case of FMCW radar, a minute motion may appear as a phase change of a signal of a frequency bin or a distance bin configured by spectrum decomposition. With respect to a target having a motion of being far away from the radar, the phase may be linearly reduced due to the micro doppler effect and a minute distance change. Such a phase value may be wrapped by 360 degrees.

Normal unwrapping uses π as an unwrapping reference value in order to avoid ambiguity of the phase as shown in algorithm 1 proposed in FIG. 4. This is most appropriate when a phase change value is random. However, in the case of a system that knows a phase change value due to vital signals, the unwrapping reference value may be adaptively applied according to a minute distance change and a phase sampling frequency.

An IF signal of FMCW radar may be expressed by Equation 2 presented below:

[Equation 2]

$$A\sin(2\pi ft + \Delta\omega)$$
$$f = \frac{S2d}{c},$$
$$\Delta\omega = \frac{4\pi \Delta d_s}{\lambda}$$

where A is an intensity (voltage) of an IF signal, d is a distance (m) between radar and a target, S is a frequency modulation slope (MHz/us), c is the velocity of light, f is a bit frequency on a target, $\Delta d_s$ is a change of minute motion of a target, $\Delta\omega$ is a phase change, and λ is a RF central frequency wavelength.

As described above, vital signals show a minute motion through respiration (0.1-0.5 Hz, 1-12 mm) and heartbeat (0.8-2 Hz, 0.1-0.5 mm), and other motions may be regarded through clutter. When only such vital signals exist, a chest wall displacement x(t) may be calculated by Equation 3 presented below:

[Equation 3]

$$x_b(t) = d_{sb}\cos(2\pi f_b t + \theta_b) \quad \text{(formula (1))}$$

If $0 \le d_{sh} < 0.2$, $$0 \le f_h < \left(\frac{150}{60}\right)$$
$$0 \le d_{sb} < 12, \quad \text{(formula (2))}$$
$$0 \le f_b < \left(\frac{25}{60}\right)$$

then $$x_h\left(x + \frac{1}{f_s}\right) - x_h(t) = \frac{d_{sh} \cdot f_h}{f_s}$$
$$x_b\left(x + \frac{1}{f_s}\right) - x_b(t) = \frac{d_{sb} \cdot f_b}{f_s}$$

where $\theta_h$ is a heartbeat minute motion start phase (unknown parameter), $\theta_b$ is a respiration minute motion start phase (unknown parameter), $d_{sh}$ is a heartbeat minute motion distance (mm), and $d_{sb}$ is a respiration minute motion distance (mm).

Equation 3 which indicates a chest motion distance may be rearranged based on phase values as in Equation 4 presented below:

[Equation 4]

$$\Delta\omega(t) = \Delta\omega_h(t) + \Delta\omega_b(t) \quad \text{(formula (3))}$$
$$\Delta\omega_h = \frac{4\pi \cdot d_{sh}}{\lambda}, \quad \text{(formula (4))}$$
$$\Delta\omega_b = \frac{4\pi \cdot d_{sb}}{\lambda}$$
$$\omega_h\left(t + \frac{1}{f_s}\right) - \omega_h(t) = \frac{\omega_h \cdot f_h}{f_s}$$
$$\omega_b\left(t + \frac{1}{f_s}\right) - \omega_b(t) = \frac{\omega_s \cdot f_b}{f_s} \quad \text{(formula (5))}$$

When a difference between an inverted phase and a previous phase value is minimum, a maximum motion appears at 360 degrees. When a distance change $d_{sh}$ caused by heartbeat and a heartbeat frequency (bpm, $f_h$) are maximum in formula 1, a phase change $w_{sh}$ caused by heartbeat may have a maximum value. In addition, a phase change $w_{sb}$, caused by respiration may also be calculated. Accordingly, a minimum value of the difference between the inverted phase and the previous phase value may be calculated by formula 3.

[Equation 5]

$$\Delta\omega_{max}(t) = \frac{\frac{4\pi \cdot d_{sh\_max}}{\lambda} \cdot f_{h\_max}}{f_s} + \frac{\frac{4\pi \cdot d_{sb\_max}}{\lambda} \cdot f_{b\_max}}{f_s} \quad \text{(formula (6))}$$

Formula (6) of Equation 5 may be established by using formulas (3), (4), (5) of Equation 4. Accordingly, an unwrapping reference value which is a criterion for inverting a phase of an unwrapping algorithm may be defined as $2\pi - \Delta\omega$ as proposed in FIG. 5, and an adaptive phase unwrapping algorithm may be applied according to an RF central frequency and a pulse repetition frequency (PRF) or a phase sampling frequency $f_s$.

When there is a sudden phase change caused by clutter other than vital signals, the corresponding phase change may be avoided through the adaptive phase unwrapping algorithm (FIG. 5) proposed in an embodiment of the disclosure, so that distortion of a phase profile may be prevented and vital signals may be detected more accurately than in a signal processing technique using a related-art unwrapping algorithm.

5) Range Bin Selection Method Using an Inverse Proportion Correlation Coefficient of a Phase and an RCS Size In order to detect a target having vital signals, a moving target may be separated from a stationary target through a moving target indicator (MTI) filter and a constant false alarm rate (CFAR) algorithm. Even a person without a motion may be separated from a stationary object due to his/her minute motion. It is assumed that there is a target person in a range bin having a maximum signal intensity among targets passing through the MTI filter. When a person is targeted through FMCW radar, vital signals may be normally detected from a plurality of range bins. A range bin selection technique using an inversely proportional correlation between a phase and an RCS is proposed to select a range bin having strongest vital signals from range bins adjacent to a range bin having a maximum signal intensity value.

A phase profile and a signal intensity may have an inversely proportional relationship according to the FMCW radar principle through adaptive unwrapping. Accordingly, it can be seen that vital signals in a range bin having the largest correlation coefficient, which is calculated by Equation 6, are strong.

[Equation 6]

$$PDD(t) = \frac{\text{cov}[M(t), P(t)]}{-\sigma_M \sigma_P} \cdot \sigma^2_{\hat{M}} \sigma^2_{\hat{P}}$$

$$PDD(t) = \underbrace{\frac{\text{cov}[M(t), P(t)]}{-\sigma_M \sigma_P}}_{\text{decorrelation term}} \cdot \underbrace{\sigma^2_{\hat{M}} \sigma^2_{\hat{P}}}_{\text{signal intensity term}} =$$

$$\frac{\sum_i^n \frac{(M(i) - \mu_M)(P(i) - \mu_P)}{n}}{-\sqrt{\sum_i^n \frac{(M(i) - \mu_M)}{n}} \sqrt{\sum_i^n \frac{(P(i) - \mu_P)}{n}}} \cdot \frac{\sum_i^n \alpha M(i) \sum_i^n \beta P(i)}{n} =$$

$$\frac{\sum_i^n M(i) \sum_i^n P(i)}{-\sqrt{\sum_i^n (M(i))^2} \sqrt{\sum_i^{nj} (P(i))^2}} \cdot \frac{\sum_i^n \alpha M(i) \sum_i^n \beta P(i)}{n}$$

$$\mu_M = 0,$$

$$\mu_P = 0$$

$$\hat{M}(t) = \alpha M,$$

$$\hat{P}(t) = \beta P$$

Figure 6:
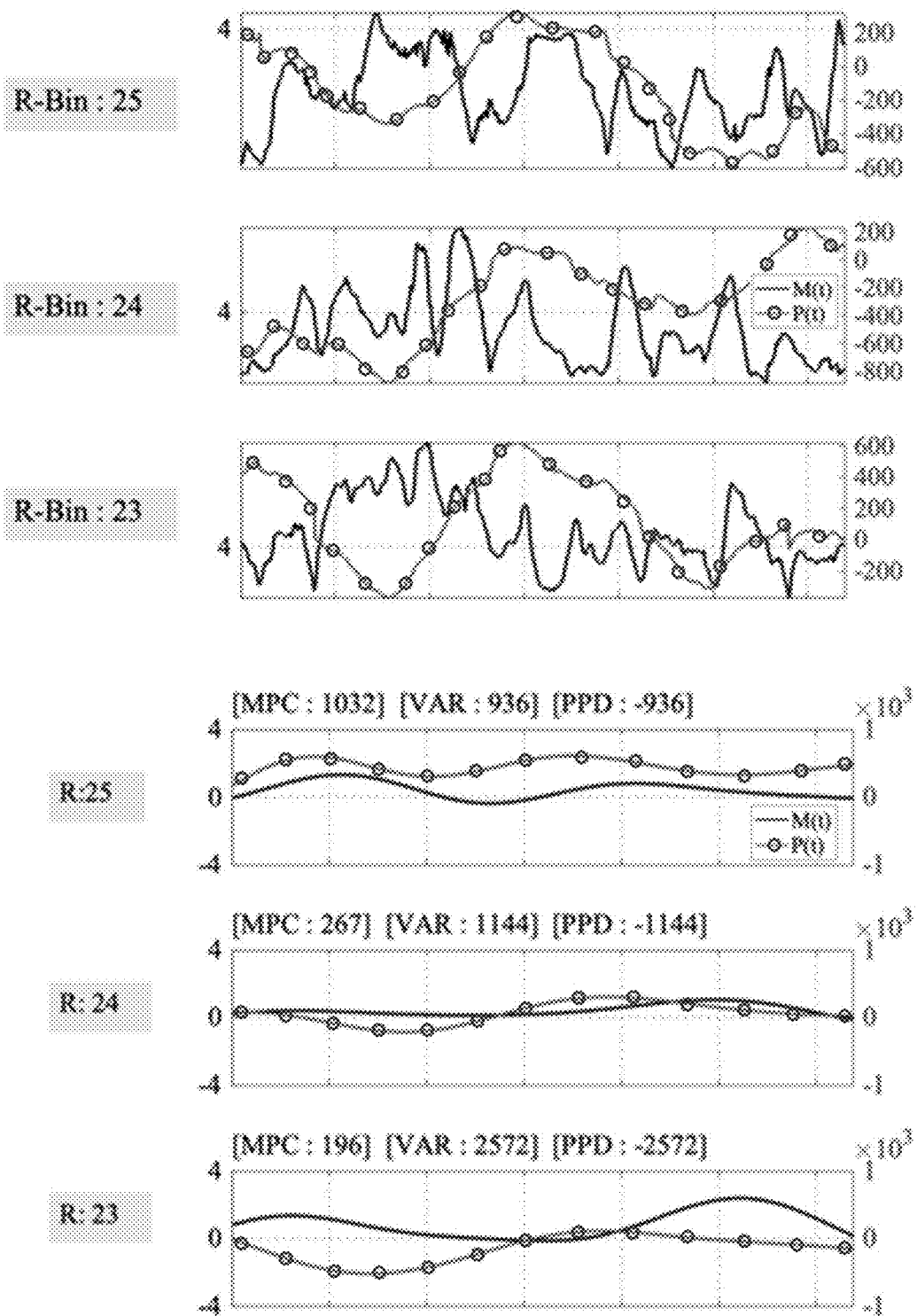
FIG. 6 is a view illustrating a phase profile and a signal intensity profile, and a correlation coefficient for target detection.

In Equation 6, PDD is the abbreviation for "phase deviation and magnitude-phase decorrelation". In an embodiment of the disclosure, a characteristic that a phase and a signal intensity are inversely proportional to each other is used and a reference phase value is a value from which clutter like a motion of arm is removed through the adaptive unwrapping algorithm. A correlation coefficient of range bins derived by using Equation 6 is as shown in FIG. 6. In FIG. 6, graphs on the left show a phase profile and a signal intensity profile according to a range bin, and graphs on the right show a correlation coefficient calculated after BPF filtering.

6) FMCW Radar Target Detection System for Vital Signal Detection

Figure 7:
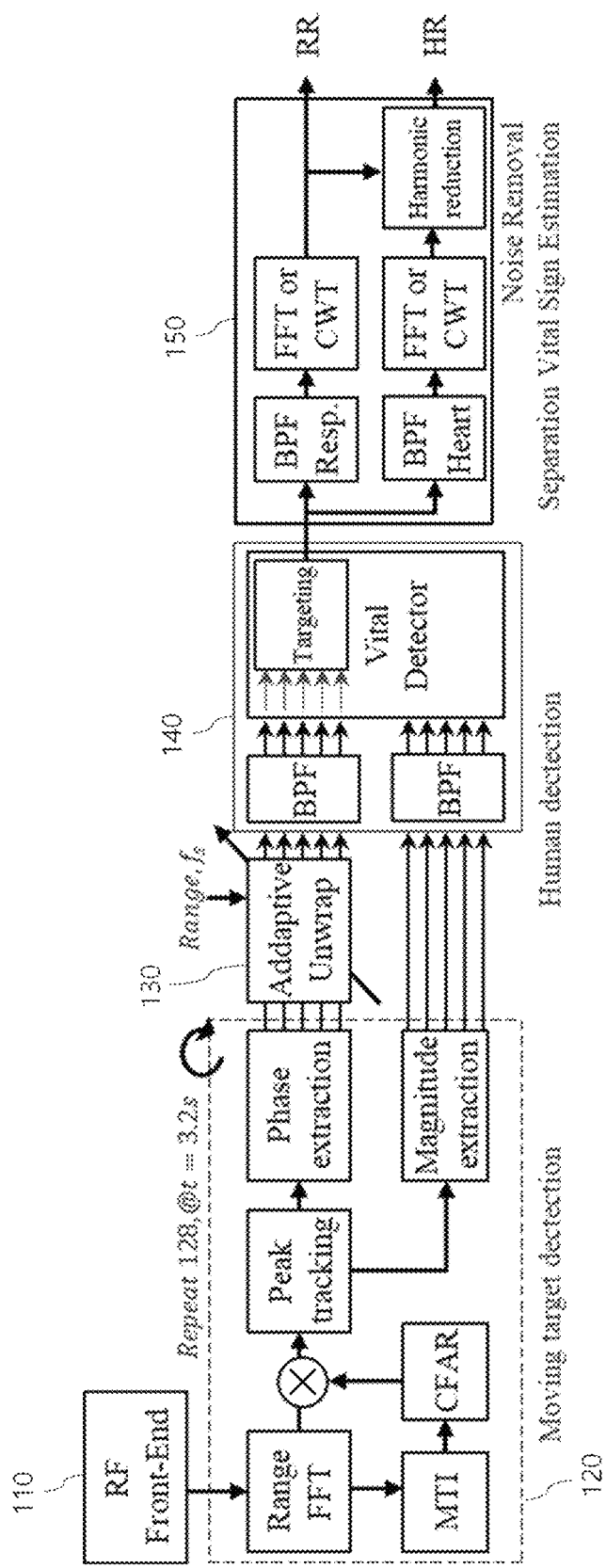
FIG. 7 is a view illustrating a configuration of an FMCW radar target detection system according to an embodiment of the disclosure.
Figure 8:
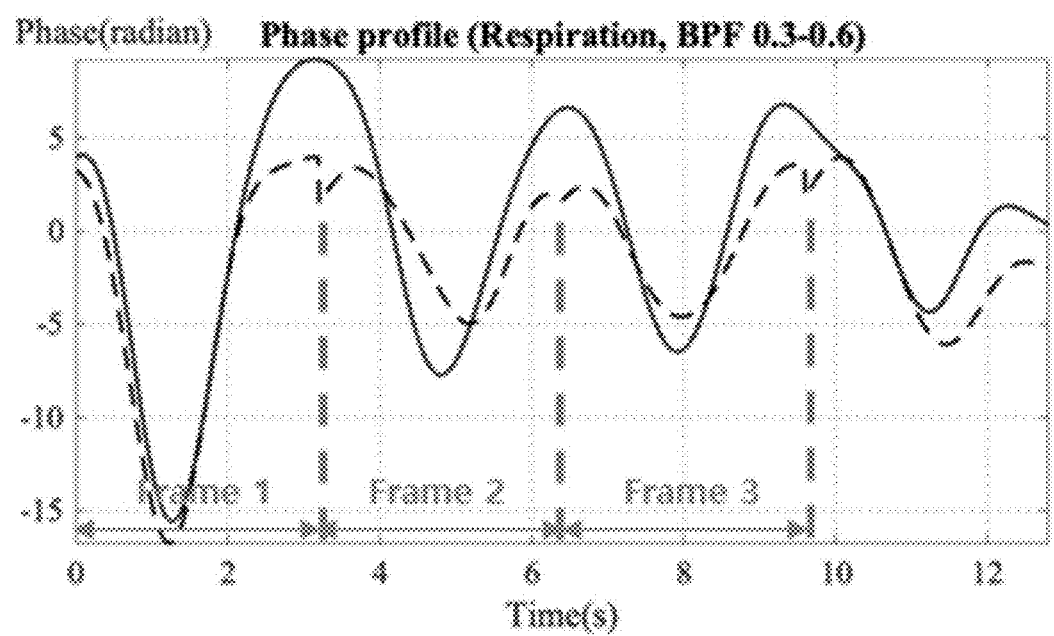
FIGS. 8 to 11 are views illustrating comparison of vital signals before and after phase offset calibration.
Figure 9:
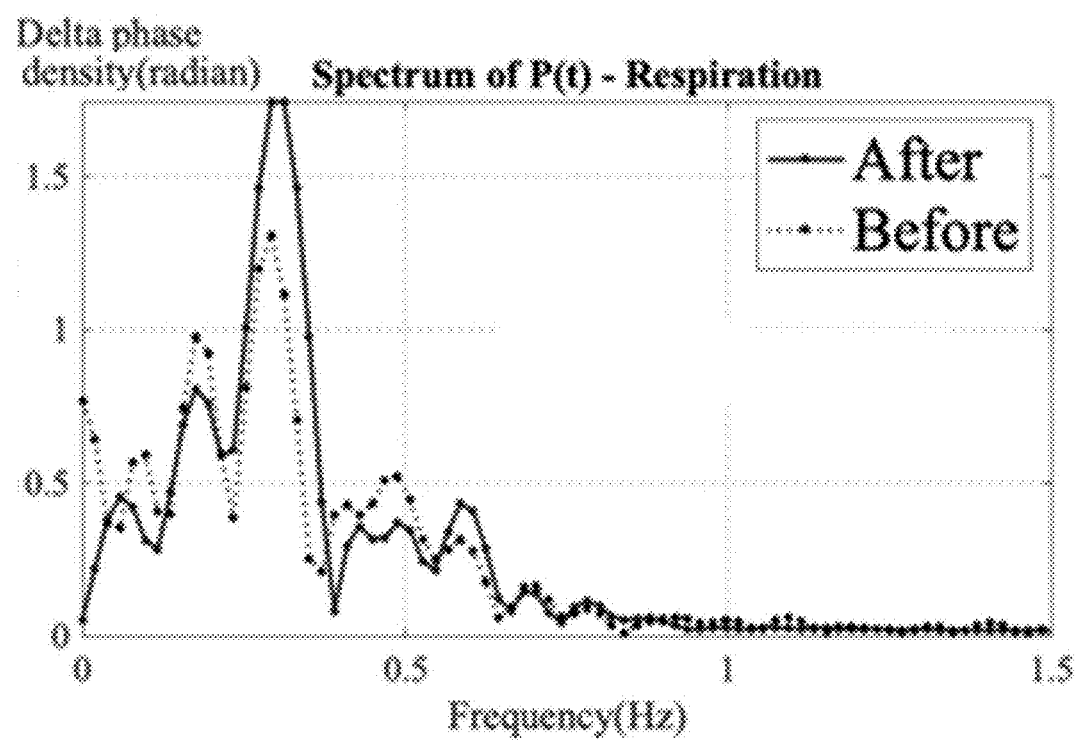
Figure 10:
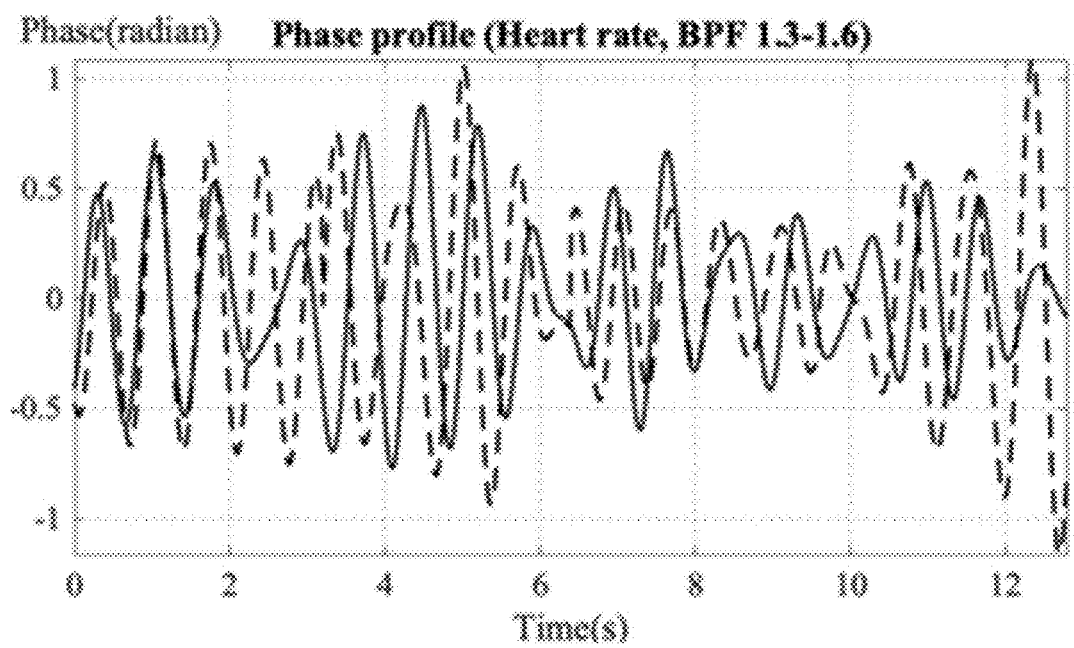
Figure 11:
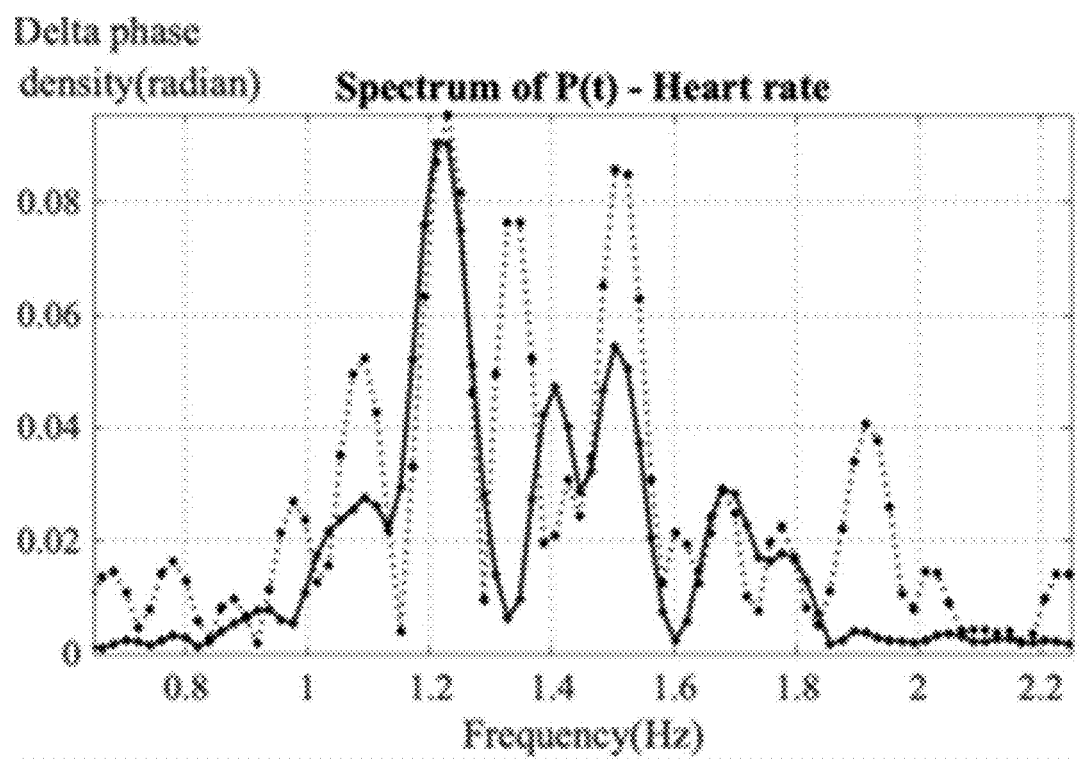
Figure 12:
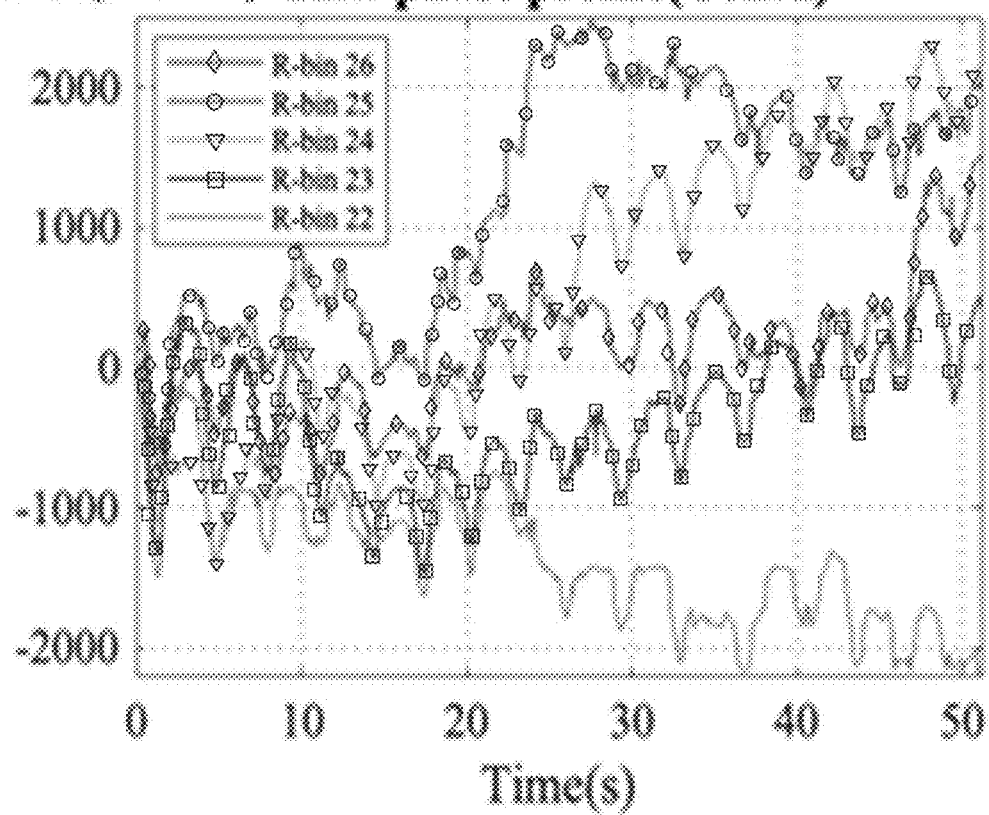
FIGS. 12 to 17 are view illustrating comparison of results of selecting a range bin according to a related-art method and the method of embodiments of the disclosure, and comparison of results of estimating vital signals therebetween.
Figure 13:
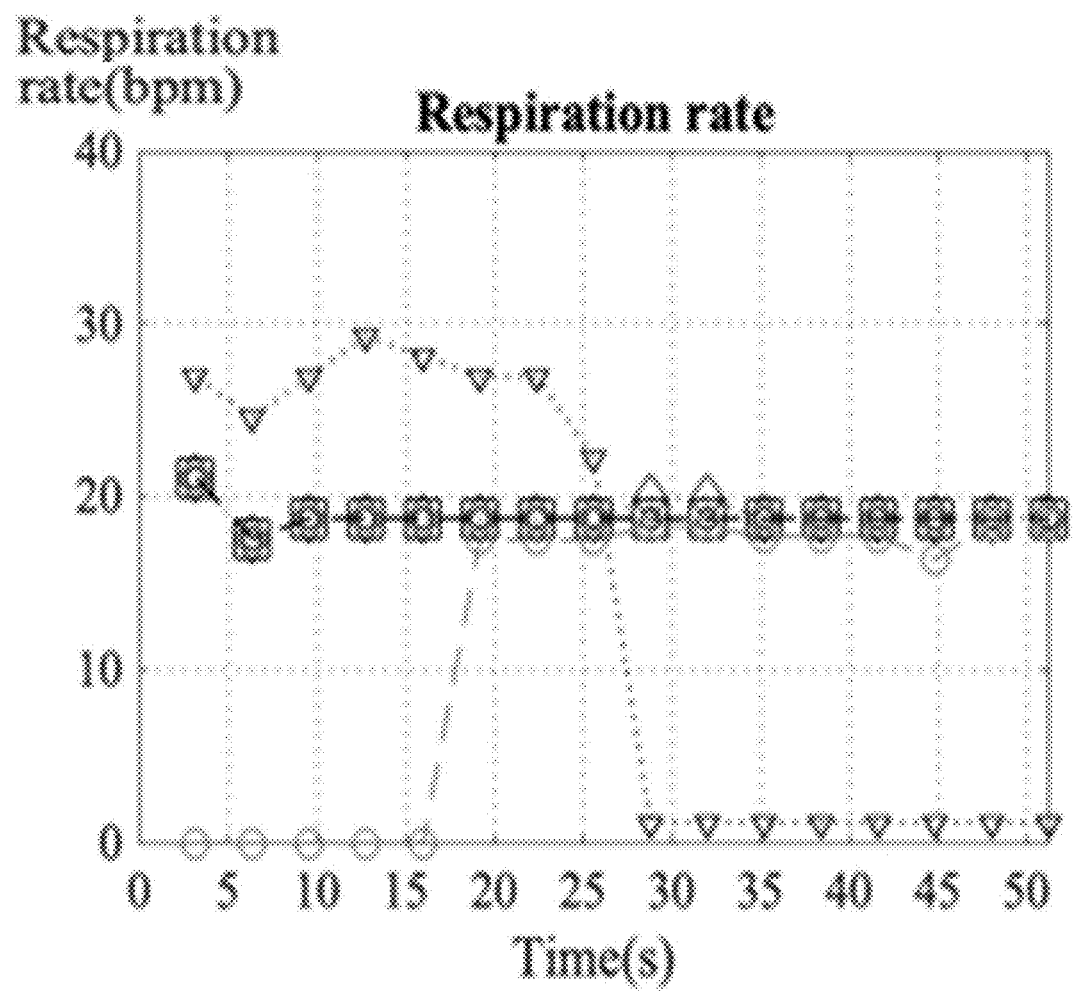
Figure 14:
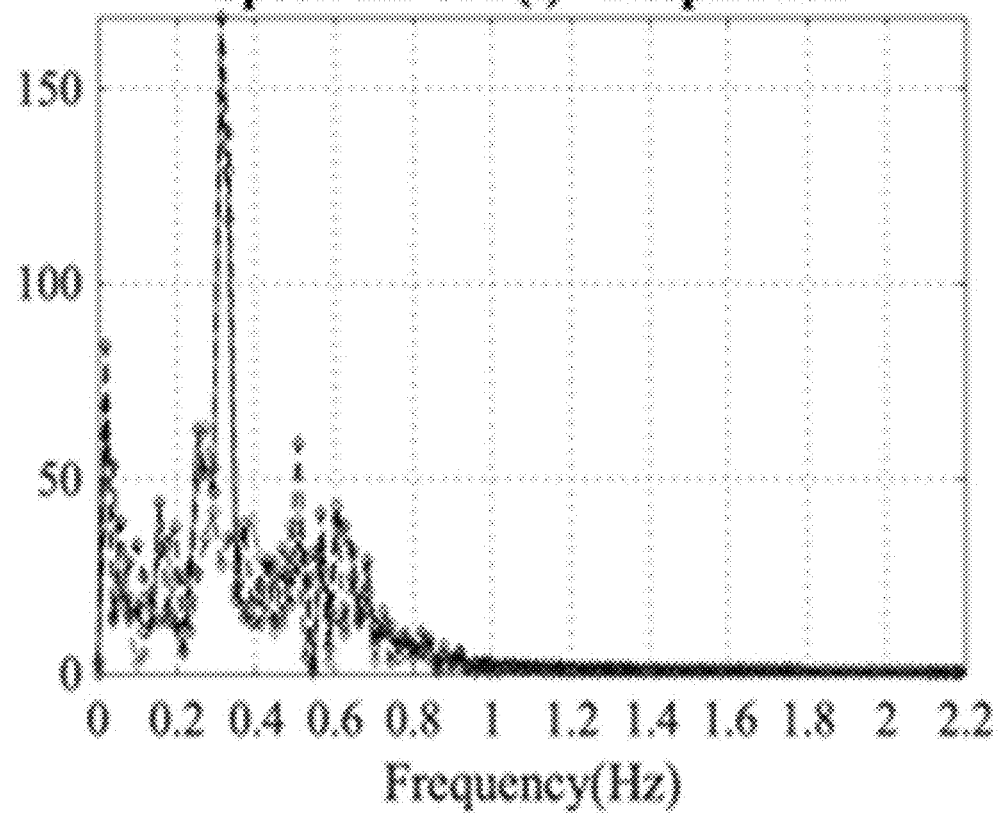
Figure 15:
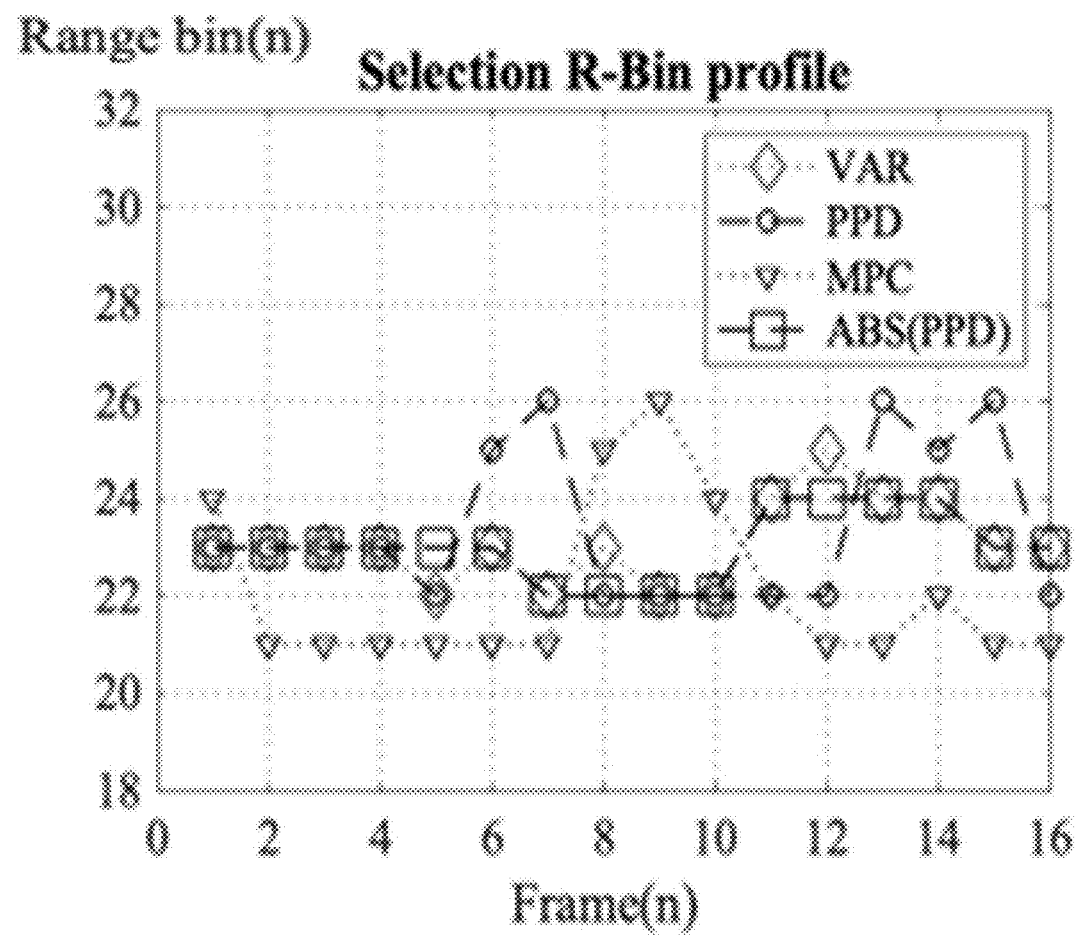
Figure 16:
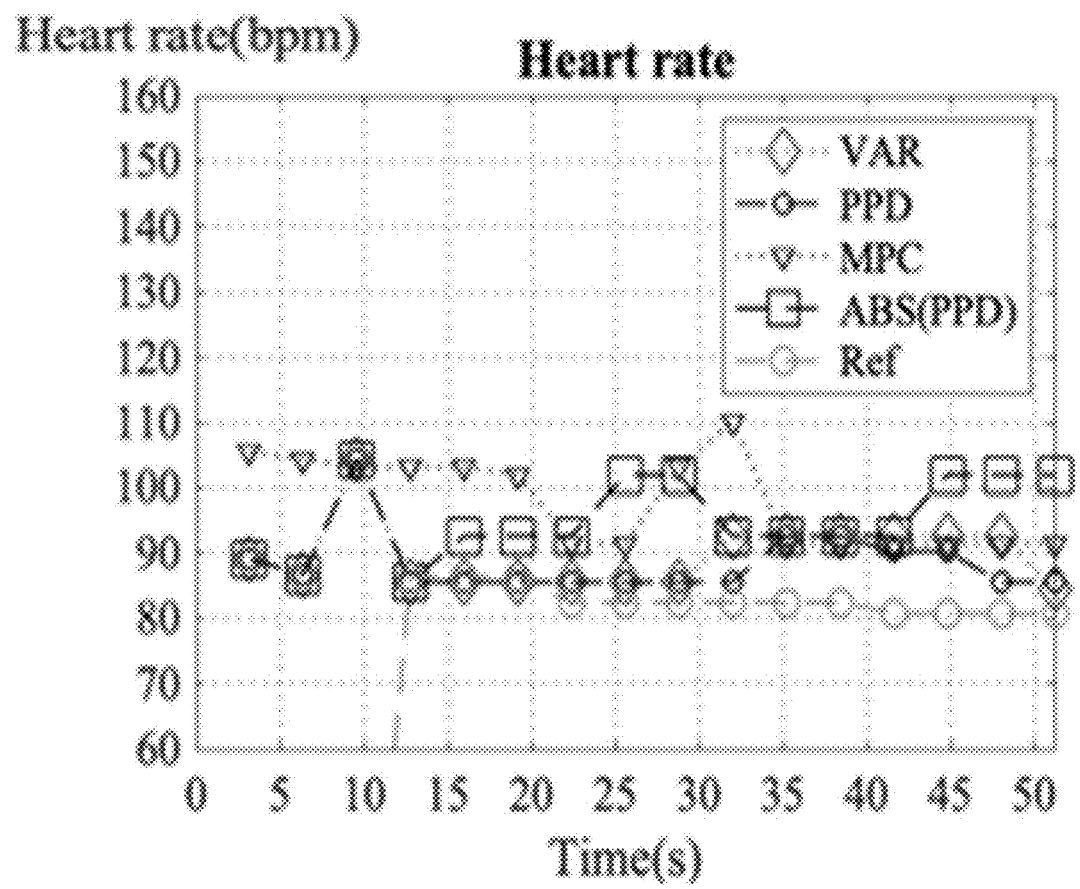
Figure 17:
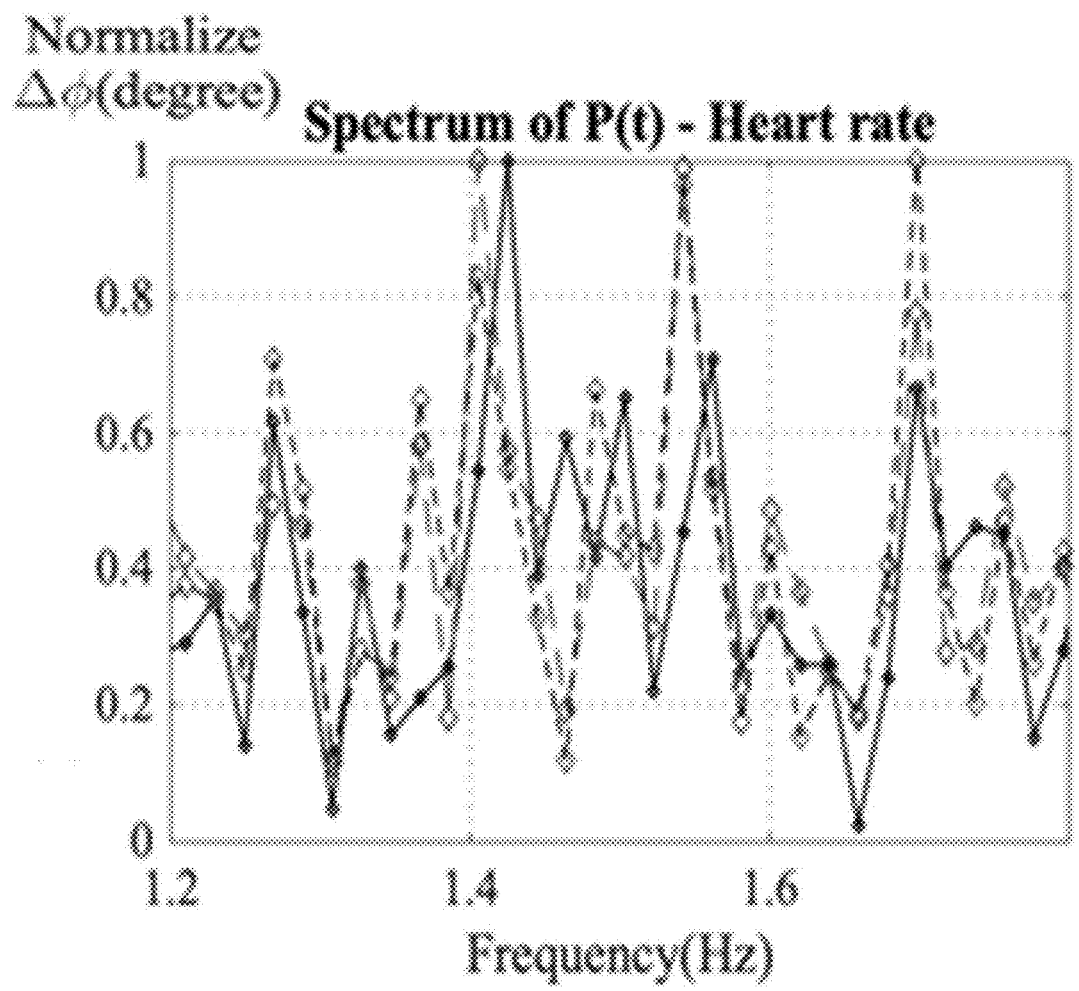

FIG. 7 is a view illustrating a configuration of an FMCW radar target detection system according to an embodiment of the disclosure.

The FMCW radar target detection system according to an embodiment is a system for detecting vital signals, and includes an RF front-end 110, a target detection unit 120, an adaptive unwrapping unit 130, a human detection unit 140, a vital signal generation unit 150 as shown in FIG. 7.

The RF front-end 110 transmits a radar signal and down-converts a radar signal reflected and received from a target (human) into an IF signal, and outputs the IF signal.

The target detection unit 120 is configured to extract phase signals and magnitude signals of a peak range bin and neighboring range bins from the IF signal outputted from the RF front-end 110, and includes a range fast Fourier transform (FFT) calculation unit, an MTI filter, a CFAR calculation unit, a multiplication unit, a peak tracking unit, a phase extraction unit, and a magnitude extraction unit.

The range FFT calculation unit converts the IF signal into a plurality of range bins by spectrum decomposition through FFT. The MTI filter and the CFAR calculation unit distinguishes a stationary target and a moving target from the plurality of range bins. The multiplication unit separates only distance bins regarding the moving target by multiplying a result of calculating by the range FFT calculation unit and a result of calculating by the CFAR calculation unit.

The peak tracking unit tracks a peak range bin among the separated range bins. The phase extraction unit extracts phase signals from the peak range bin tracked by the peak tracking unit and the neighboring range bins, and the magnitude extraction unit extracts magnitude signals of the peak range bin and the neighboring range bins. Two neighboring range bins may be implemented on each of the left and right sides, such that four neighboring range bins in total are implemented. This is merely an example, and a different number of neighboring range bins may be implemented. When the number of neighboring range bins is four, the number of phase signals outputted from the phase extraction unit and the number of magnitude signals outputted from the magnitude extraction unit may be 5, respectively.

The adaptive unwrapping unit 130 unwraps the phase signals extracted by the phase extraction unit, based on an adaptive reference value of $2\pi - \Delta\omega$. That is, as shown in FIG. 5, if non-weakness of the phase exceeds $2\pi - \Delta\omega$, $2\pi$ is subtracted from the phase, and, if the non-weakness of the phase is less than $2\pi - \Delta\omega$, $2\pi$ is added to the phase. $\Delta\omega$ equals $(\omega_R + \omega_H)/\text{PRF}$, where $\omega_R$ is an angular velocity of respiration and $\omega_H$ is an angular velocity of heartbeat.

The human detection unit 140 is configured to select an optimal range bin to be able to detect accurate vital signal information based on the phase signals unwrapped by the adaptive unwrapping unit 130 and the magnitude signals outputted from the magnitude extraction unit, and includes band pass filters (BPFs) and a vital detector.

The BPF (upper portion) may remove a noise by filtering the unwrapped phase signals, and the BPF (lower portion) may remove a noise by filtering the magnitude signals. The vital detector may select a range bin having the largest correlation coefficient by calculating a correlation coefficient between signals of the same range bin with respect to the phase signals and the magnitude signals from which noises are removed.

The vital signal generation unit 150 is configured to restore a respiration signal and a heartbeat signal by using the unwrapped phase signals of the range bin selected by the human detection unit 140, and includes BPFs, FFT/CWT calculation units, and a harmonic reduction unit.

The BPF (Resp) extracts a respiration signal by filtering a respiration signal band from the unwrapped phase signals of the range bin selected by the human detection unit 140, and the FFT/CTW calculation unit (upper portion) performs spectrum decomposition with respect to the extracted respiration signal through FFT or CTW, and outputs the signal.

The BPF (Heart) extracts a heartbeat signal by filtering a heartbeat band from the unwrapped phase signals of the range bin selected by the human detection unit 140, and the FFT/CTW calculation unit (lower portion) performs spectrum decomposition with respect to the extracted heartbeat signal through FFT or CTW. The harmonic reduction unit removes harmonic components of the respiration signal from the spectrum-decomposed heartbeat signal, and outputs the signal.

7) Performance Evaluation-Vital Signal Numerical Value Accuracy

The FMCW radar target detection system according to an embodiment may detect a phase profile through adaptive unwrapping, may target a range bin where there exist strong vital signals by using a PPD correlation coefficient, and may perform signal separation by filtering a respiration signal component frequency band and a heartbeat signal component frequency band from the corresponding phase profile through BPFs, respectively. A respiration rate and a heart rate may be detected based on a maximum value of a vital signal frequency component by performing FFT with respect to the separated signals.

Respiration and heart rate signals measured based on FMCW radar are as proposed in FIGS. 8 to 11. Related-art techniques have a demerit of long frame time of 10 seconds or longer. However, the disclosure shows enhanced vital signal tracking performance by having a short frame time of 3 seconds. In order to solve a signal discretization problem occurring due to the short frame time, an inter-frame phase offset may be calibrated as shown in FIGS. 8 to 11, so that vital signal estimation SNR performance can be maintained.

FIGS. 12 to 17 are views illustrating results of comparing vital signal estimation values with those of related-art techniques (MPC technique, VAR technique) in order to validate the method proposed in an embodiment of the disclosure. Accuracy may be calculated by calculating a vital signal estimation error by using a heart rate of an ECG sensor and a respiration rate of a respiration belt of bio pack equipment as a reference value. As a result of evaluating the method according to an embodiment of the disclosure, vital signal detection accuracy higher than in related-art technology is obtained.

Up to now, the FMCW radar target detection method for detecting vital signals has been described in detail with reference to preferred embodiments.

In the above-described embodiments, a target range bin is selected by using a correlation between a phase change profile of an IF signal caused by a minute motion, and a target signal intensity change profile according to a change in RCS, so that accuracy and performance of target tracking and calculation of a target distance can be enhanced.

In addition, accuracy and performance of vital signal estimation can be enhanced by reducing a phase change caused by a motion other than vital signals through phase unwrapping, which uses an adaptive reference value (180°–Δw) considering a PRF and a distance of a minute motion.

In addition, a chirp signal from which a motion is estimated may be avoided, and, when a range bin is changed, vital signals may be detected while tracking a target through calibration of a phase size.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A method for detecting vital signals by using radar, the method comprising:
    converting radar signals which are pre-processed after being reflected and received from a human body into a plurality of range bins;
    tracking a peak range bin among the plurality of range bins;
    extracting phase signals of the plurality of range bins comprising the peak range bin;
    extracting magnitude signals of the plurality of range bins comprising the peak range bin;
    unwrapping the phase signals based on an adaptive reference value;
    selecting one range bin from the plurality of range bins based on a correlation coefficient between signals of the selected range bin, with respect to the phase signals and the magnitude signals,
    wherein the adaptive reference value is adaptively determined based on a distance change or displacement between the radar and the human body caused by a motion other than the vital signals and a sampling frequency for the phase signals; and
    detecting the vital signals by using the unwrapped phase signals regarding the selected range bin.

2. The method of claim 1, further comprising separating only range bins regarding a moving target from the plurality of range bins, while not separating other range bins regarding a non-moving target,
    wherein the tracking comprises tracking the peak range bin among the separated range bins regarding the moving target.

3. The method of claim 1, wherein the adaptive reference value equals $2\pi - \Delta\omega$, wherein the $\Delta\omega$ is a phase change.

4. The method of claim 3, wherein the Aw is the phase change determined based on an angular velocity of the vital signals.

5. The method of claim 4, wherein the Aw is determined based on a pulse repetition frequency (PRF).

6. The method of claim 1, wherein the selecting comprises:
removing a noise by filtering the unwrapped phase signals;
removing a noise by filtering the magnitude signals; and
determining the one range bin based on the correlation coefficient between the signals of the same range bin, with respect to the phase signals and the magnitude signals from which the noises are removed.

7. The method of claim 1, wherein detecting further comprises:
extracting a first vital signal, of the vital signals, by filtering a first band from phase signals regarding the selected range bin; and
extracting a second vital signal, of the vital signals, by filtering a second band from the phase signals regarding the selected range bin.

8. The method of claim 7, wherein the detecting further comprises:
spectrum-decomposing the first vital signal and outputting a signal having a result of the spectrum-decomposing the first vital signal;
spectrum-decomposing the second vital signal; and
removing harmonic components of the spectrum-decomposed first vital signal from the spectrum-decomposed second vital signal, and outputting a result of removing.

9. The method of claim 8, wherein the first vital signal is a respiration signal, and
wherein the second vital signal is a heartbeat signal.

10. The method of claim 1, wherein the plurality of range bins include the peak range bin and a defined number of neighboring range bins.

11. A system for detecting vital signals by using radar, the system comprising:
one or more processors configured to:
convert radar signals which are pre-processed after being reflected and received from a human body into a plurality of range bins;
track a peak range bin among the plurality of range bins;
configured to extract phase signals of the plurality of range bins comprising the peak range bin;
extract magnitude signals of the plurality of range bins comprising the peak range bin;
unwrapping the phase signals based on an adaptive reference value;
select one range bin from the plurality of range bins based on a correlation coefficient between signals of the selected range bin, with respect to the phase signals and the magnitude signals,
wherein the adaptive reference value being is adaptively determined based on a distance change or displacement between the radar and the human body caused by a motion other than the vital signals and a sampling frequency for the phase signals; and
detect the vital signals by using the unwrapped phase signals regarding the selected range bin.

12. The system of claim 11, further comprising separating only range bins regarding a moving target from the plurality of range bins, while not separating other range bins regarding a non-moving target,
wherein the tracking comprises tracking the peak range bin among the separated range bins regarding the moving target.

13. The system of claim 11, wherein the adaptive reference value equals $2\pi - \Delta\omega$, wherein the $\Delta\omega$ is a phase change.

14. The system of claim 13, wherein the $\Delta\omega$ is the phase change determined based on an angular velocity of the vital signals.

15. The system of claim 14, wherein the Aw is determined based on a pulse repetition frequency (PRF).

16. The system of claim 11, wherein the selecting comprises:
removing a noise by filtering the unwrapped phase signals;
removing a noise by filtering the magnitude signals; and
determining the one range bin based on the correlation coefficient between the signals of the same range bin, with respect to the phase signals and the magnitude signals from which the noises are removed.

17. The system of claim 11, wherein detecting further comprises:
extracting a first vital signal, of the vital signals, by filtering a first band from phase signals regarding the selected range bin; and
extracting a second vital signal, of the vital signals, by filtering a second band from the phase signals regarding the selected range bin.

18. The system of claim 17, wherein the detecting further comprises:
spectrum-decomposing the first vital signal and outputting a signal having a result of the spectrum-decomposing the first vital signal;
spectrum-decomposing the second vital signal; and
removing harmonic components of the spectrum-decomposed first vital signal from the spectrum-decomposed second vital signal, and outputting a result of removing.

19. The system of claim 18,
wherein the first vital signal is a respiration signal,
wherein the second vital signal is a heartbeat signal, and
wherein the plurality of range bins include the peak range bin and a defined number of neighboring range bins.

20. A method for detecting vital signals by using radar, the method comprising:
converting radar signals which are pre-processed after being reflected and received from a human body into a plurality of range bins;
tracking a peak range bin among the range bins;
extracting phase signals of the plurality of range bins comprising the peak range bin;
unwrapping the extracted phase signals based on an adaptive reference value;
selecting one range bin from the plurality of range bins based on the unwrapped phase signals,
wherein the adaptive reference value is adaptively determined based on a distance change or displacement between the radar and the human body caused by a motion other than the vital signals and a sampling frequency for the phase signals; and
detecting the vital signals by using the unwrapped phase signals regarding the selected range bin.

* * * * *